Feb. 19, 1957 L. E. DREHMAN 2,782,244
ISOMERIZING HYDROCARBONS WITH THE CATALYST IN THE CONTINUOUS
PHASE INVERTING THE PHASES AND SEPARATING THE
CATALYST EMPLOYING PHASE INVERSION
Filed Jan. 24, 1952
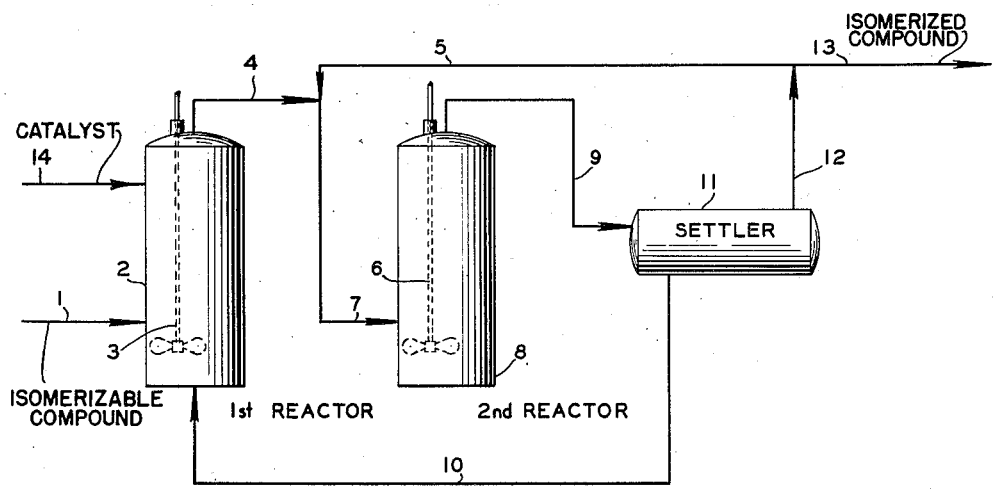
*INVENTOR.*
LEWIS E. DREHMAN
BY
*Hudson and Young*
ATTORNEYS

United States Patent Office 2,782,244
Patented Feb. 19, 1957

2,782,244

ISOMERIZING HYDROCARBONS WITH THE CATALYST IN THE CONTINUOUS PHASE INVERTING THE PHASES AND SEPARATING THE CATALYST EMPLOYING PHASE INVERSION

Lewis E. Drehman, Bartlesville, Okla., assignor to Phillips Petroleum Company, a corporation of Delaware Application January 24, 1952, Serial No. 267,972

7 Claims. (Cl. 260—683.5)

This invention relates to the isomerization or the change of skeletal structure of organic compounds, for example hydrocarbons. In one of its aspects the invention relates to the isomerization of saturated hydrocarbons. In another of its aspects the invention relates to the isomerization of paraffinic and/or cyclic hydrocarbons in the presence of a non-miscible catalyst, for example a fluid aluminum halide-hydrocarbon complex, under conditions and in a manner to obtain certain improved yields and catalyst-from-product separation as set forth herein. In still another aspect of the invention it relates to a combination of steps involving a phase inversion during an isomerization of hydrocarbons as set forth herein.

Aluminum chloride catalysts have been found very useful in numerous processes for the conversion of hydrocarbons, including the isomerization of hydrocarbons of either straight-chain or cyclic structure to form hydrocarbons of either branch-chain or other cyclic structure having higher octane ratings. In such processes, the aluminum chloride catalyst has either been used as such, suspended in or dissolved in a reaction mixture, supported on solid supports, or used as a separate liquid in the form of a complex with organic or inorganic compounds. The more useful of the liquid complexes are those formed with paraffinic hydrocarbons or paraffinic hydrocarbon fractions. Satisfactory fluid complexes have been prepared from a variety of paraffin hydrocarbons, including normal heptane, isooctane, kerosene, and an olefinic polymer fraction boiling in the upper part of the gasoline range. In many instances it has been found desirable to have present in the catalyst a small amount of hydrogen chloride of from 0.1 to about 5 or 6 percent by weight or even more as a catalyst promoter. The hydrogen chloride can either be added deliberately or be present as a result of side reactions such as when water is present in the charged material or when an organic halogen compound is present. It is necessary in most operations to maintain the activity of the catalyst by either mixing aluminum chloride directly with a suitable portion of recycled catalyst or adding a catalyst paste made of aluminum chloride and used catalyst to the reaction mixture.

In the usual process employing the fluid aluminum chloride-hydrocarbon complex catalyst, a volume ratio of hydrocarbon to catalyst in the reaction zone of some value greater than one has ordinarily been employed. When the reaction mixture is intimately admixed with the catalyst under these conditions, the hydrocarbon phase forms a continuous phase and the catalyst phase the discontinuous phase.

When the process is carried out under conditions in which the hydrocarbon to catalyst ratio is less than one a phase inversion in which the catalyst phase is the continuous phase and the hydrocarbon phase is the discontinuous phase takes place. Under these conditions, the physical separation between the hydrocarbon phase and the catalyst phase is quite difficult and the power requirement for adequate mixing of the hydrocarbons and catalyst is somewhat higher than with the opposite phase relationships.

I have now discovered a process for the isomerization of paraffinic and/or cyclic hydrocarbons in the presence of a fluid aluminum chloride-hydrocarbon complex catalyst in which the catalyst phase is continuous and the hydrocarbon phase is discontinuous and an advantageous increase in conversion is obtained without encountering catalyst-from-product separation difficulty.

Principally, my invention comprises passing a hydrocarbon stream into a thoroughly agitated reactor in which the volume of fluid catalyst is such that the volume ratio of hydrocarbon to catalyst is less than one, passing substantially all of the contents of the reactor into a second thoroughly agitated reactor into which is added a sufficient quantity of a hydrocarbon recycle stream to cause a phase inversion to take place so that the hydrocarbon phase becomes the continuous phase and the catalyst phase becomes the discontinuous phase, and finally passing the total contents of the second reactor to a settler for the separation of the hydrocarbon product from the catalyst complex. In my process, the primary isomerization reaction takes place in the first reactor where the volume ratio of hydrocarbon to catalyst is less than one, but additional isomerization can take place in the second reactor where the hydrocarbon-catalyst volume ratio is greater than one, as in the usual method of operation. The primary purpose of the second reactor, however, is as a mixer for effecting the phase inversion. Regardless of the amount of isomerization in the second reactor, this reactor is necessary for the operability of my process because only by effecting this phase inversion can the separation of the hydrocarbon product from the fluid catalyst complex be readily accomplished.

In a general way, the process of my reaction is performed with mild temperatures between about 80 and 300° F. and preferably between 200 and 260° F. and sufficient pressure to maintain the liquid phase. Each of the reactors can be maintained under substantially the same operating conditions when isomerization is to take place in both reactors; however, the second reactor can be operated at considerably lower temperatures if very little isomerization and only the phase inversion is desired in that reactor. As stated, the hydrocarbon-catalyst ratio in the first reactor is maintained so that the catalyst phase is the continuous phase and is in the range of 0.1 to 1.0, and preferably about 0.5. In the second reactor, the hydrocarbon phase is the continuous phase and the ratio is maintained at a value greater than 1 and usually approximately 1.5.

Therefore, according to my invention there has been provided a process for isomerization of an organic material, for example, an isomerizable hydrocarbon, which comprises intimately contacting in a first zone the said hydrocarbon and a catalyst immiscible therewith in a volume ratio of hydrocarbon-to-catalyst of less than 1, to provide a continuous catalyst phase and a discontinuous hydrocarbon phase; in said zone subjecting the intimately contacted hydrocarbon and catalyst mixture to isomerization reaction conditions; removing said mixture from said first zone; admixing with said mixture a proportion of additional hydrocarbon to obtain therein a hydrocarbon-catalyst ratio of greater than 1 to provide a continuous hydrocarbon phase and a discontinuous catalyst phase in a second zone; in said second zone intimately contacting said hydrocarbons and catalyst at least until said hydrocarbons form said continuous hydrocarbon phase; withdrawing the admixture of hydrocarbons and catalyst thus obtained from said second zone; and passing the same to a settling zone wherein the hydrocarbon and catalyst are readily separated.

Referring to the drawing which diagrammatically illustrates my invention, a hydrocarbon fraction containing the paraffinic hydrocarbons to be isomerized is passed through line 1 to a first reactor 2. Aluminum chloride hydrocarbon complex catalyst is introduced into reactor 2 by way of conduit 14. The hydrocarbon is intimately admixed in reactor 2 with the fluid aluminum chloride-hydrocarbon complex catalyst by the agitator 3. The hydrocarbon-catalyst volume ratio in this reactor is less than one, permitting the catalyst phase to be continuous and the hydrocarbon phase to be discontinuous, and the reaction time in this reactor is therefore considerably shorter than is usually necessary in the processes of the prior art. Substantially all the reaction mass, containing unreacted hydrocarbon feed, isomerized hydrocarbon products, catalyst and other materials, is removed from the first reactor 2 by line 4, mixed with recycle product from line 5 in line 7 and passed into a second reactor 8 wherein, by thorough agitation of the added hydrocarbon material and the effluent from the first reactor 2, by agitator 6, a phase inversion is made to take place and the hydrocarbon phase becomes continuous and the catalyst phase becomes discontinuous so that separation of the hydrocarbon product and catalyst is possible. The effluent from the second reactor 8 passes by line 9 to settler 11 where it separates into an upper phase containing the isomerized and other hydrocarbons and a lower phase containing the aluminum chloride-hydrocarbon complex.

The hydrocarbon phase removed from the top of settler 11, through line 12, is split and one portion passes through line 13 to purification means to be recovered as a final product whereas the remaining portion is recycled by lines 5 and 7 to the second reactor 8 to effect the phase inversion of the hydrocarbon-catalyst mixture. The recycle aluminum chloride-hydrocarbon complex catalyst from the bottom of settler 11 is returned through line 10 to the first reactor 2. The activity of the catalyst can be maintained by the removal of some spent catalyst from, and the addition of fresh aluminum chloride to, the recycle stream.

*Example*

The following examples compare the results to be obtained by performing the isomerization reaction in a system in which the catalyst phase is the continuous phase and then the hydrocarbon phase is the continuous phase. In these examples, normal pentane was isomerized in a continuous system using fluid aluminum chloride-hydrocarbon complex catalyst promoted with anhydrous hydrogen chloride and containing an inhibitor of naphthene to reduce disproportionation and other undesirable reactions. The basic operating conditions, including the contact time and the catalyst addition rate, are the same; however, the hydrocarbon-catalyst ratio is 0.62 for the case in which the catalyst phase is the continuous phase and 1.1 for the case in which the hydrocarbon phase is the continuous phase. With these conditions of similar contact times and catalyst addition rates, an increase in conversion from 24 percent for the system with the hydrocarbon phase as the continuous phase to 40 percent for the system with the catalyst phase as the continuous phase is realized, together with an increase in isomerization efficiency of from 80 to 88 percent.

|  | Run 1 | Run 2 |
|---|---|---|
| Time in Period, Hrs. | 5.00 | 6.00 |
| Reactor Temperature, °F. | 210 | 210 |
| Reactor Pressure, p. s. i. g. | 400 | 400 |
| Feed Rate, cc./hr. | 505 | 370 |
| Catalyst Rate, cc./hr. | 470 | 600 |
| Contact Time, Minutes | 35.0 | 35.0 |
| Feed-Catalyst Ratio | 1.1 | 0.62 |
| Feed Composition, Wt. Percent: |  |  |
| Butane | 22.5 |  |
| Pentane | 69.0 | 90.1 |
| Methylcyclopentane | 8.5 | 9.9 |
| AlCl₃ Addition Rate, lb./bbl. Feed | 3.1 | 3.1 |
| Production Composition, Wt. Percent: |  |  |
| Isobutane | 1.9 | 2.2 |
| Butane | 23.9 |  |
| Isopentane | 13.4 | 32.1 |
| Pentane | 52.3 | 53.6 |
| Methylcyclopentane |  |  |
| Cyclohexane | 8.5 | 12.1 |
| Heavier than cyclohexane |  |  |
| HCl in Feed, Wt. Percent | 6.4 | 4.1 |
| HCl in Product, Wt. Percent | 5.3 | 3.6 |
| Pentane Conversion/Efficiency, Percent | 24/80 | 40/88 |

The effluent hydrocarbon volume was in each run substantially equal to the feed hydrocarbon volume.

Variation and modification are possible within the scope of the foregoing disclosure, drawing and appended claims to the invention the essence of which is that a mixed-phase catalytic isomerization of an organic compound, for example, a hydrocarbon, is effected with the catalyst in the continuous phase and the hydrocarbon in the discontinuous phase following which a phase inversion is accomplished, for example, by the admixture of additional hydrocarbon and then the catalyst and hydrocarbon are allowed to separate into separate phases or layers for separation, the additional hydrocarbon being supplied, preferably from said layer of hydrocarbon, the process resulting in improved yield as well as easier separation of the isomerized hydrocarbon and catalyst, by settling, or otherwise, as set forth, described and exemplified herein.

I claim:

1. A process for the isomerization of a hydrocarbon selected from the group consisting of isomerizable straight-chain and cyclic hydrocarbons under isomerization conditions which comprises the steps of in a first zone intimately admixing and contacting under said conditions all of said hydrocarbons and an isomerization catalyst immiscible therewith in a volume ratio of hydrocarbons to catalyst of less than 1, the catalyst constituting the continuous phase and the hydrocarbon constituting the discontinuous phase; then in a second zone admixing intimately with said hydrocarbon and catalyst admixture, obtained as aforesaid, a sufficient amount of a hydrocarbon to cause a phase inversion; and then allowing the final admixture thus obtained to settle and separating the catalyst and the hydrocarbon phases thus formed each from the other.

2. A process according to claim 1 wherein the hydrocarbon added to cause said phase inversion is an isomerizable hydrocarbon.

3. A process according to claim 1 wherein the hydrocarbon added to cause said phase inversion is an isomerized hydrocarbon separated from the process.

4. A process for the isomerization of a hydrocarbon selected from the group consisting of isomerizable straight-chain and cyclic hydrocarbons under isomerization conditions which comprises the steps of introducing into a first agitation zone one of said hydrocarbons and an aluminum halide hydrocarbon complex catalyst in a volume ratio of hydrocarbon to catalyst of less than 1, the catalyst being present in a proportion sufficient to be the continuous phase, maintaining said zone under isomerization conditions to accomplish substantial isomerization of said hydrocarbon, then admixing with the isomerized hydrocarbon and catalyst admixture sufficient additional isomerizable hydrocarbon to cause phase inversion thereof; then, in a second agitation zone maintained under isomerization conditions, further isomerizing the hydrocarbon in the final admixture thus obtained; then allowing said admixture to settle to form a hydrocarbon phase and a catalyst phase; and recycling the catalyst to said first agitation zone.

5. A process according to claim 4 wherein the hydrocarbon phase is fractionated to recover insufficiently isomerized hydrocarbon therefrom, the said hydrocarbon is recycled to said second agitation zone and wherein the catalyst is recycled to said first agitation zone.

6. A process according to claim 4 wherein the hydrocarbon to be isomerized is pentane and the catalyst is a liquid aluminum chloride hydrocarbon complex.

7. A process according to claim 4 wherein the hydrocarbon is a normal paraffin, the catalyst is a liquid aluminum chloride complex, the temperature in said zones is in the range 80–300° F., and the pressure is sufficient to maintain the liquid phase.

References Cited in the file of this patent

UNITED STATES PATENTS

| | | |
|---|---|---|
| 2,395,022 | Sutton et al. | Feb. 19, 1946 |
| 2,406,721 | Veltman | Aug. 27, 1946 |
| 2,454,149 | Franklin et al. | Nov. 16, 1948 |
| 2,463,768 | Hepp | Mar. 8, 1949 |